United States Patent
Brune et al.

(10) Patent No.: US 10,536,685 B2
(45) Date of Patent: Jan. 14, 2020

(54) METHOD AND APPARATUS FOR GENERATING LENS-RELATED METADATA

(71) Applicant: INTERDIGITAL CE PATENT HOLDINGS, Paris (FR)

(72) Inventors: Thomas Brune, Hannover (DE); Oliver Theis, Kalletal (DE); Thierry Borel, Rennes (FR); Valter Drazic, Betton (FR)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 0 days.

(21) Appl. No.: 15/050,524

(22) Filed: Feb. 23, 2016

(65) Prior Publication Data

US 2016/0246817 A1  Aug. 25, 2016

(30) Foreign Application Priority Data

Feb. 23, 2015 (EP) .................................... 15305275

(51) Int. Cl.
| | | |
|---|---|---|
| *H04N 13/178* | (2018.01) | |
| *H04N 13/282* | (2018.01) | |
| *H04N 5/232* | (2006.01) | |
| *H04N 5/222* | (2006.01) | |
| *H04N 5/225* | (2006.01) | |

(52) U.S. Cl.
CPC ........... *H04N 13/178* (2018.05); *H04N 5/225* (2013.01); *H04N 5/2228* (2013.01); *H04N 5/23216* (2013.01); *H04N 5/23293* (2013.01); *H04N 5/23296* (2013.01); *H04N 13/282* (2018.05)

(58) Field of Classification Search
CPC .. H04N 5/2258; H04N 5/247; H04N 13/0066; H04N 13/0242; H04N 13/025; H04N 13/0282; H04N 9/09–097; H04N 13/111; H04N 13/117; H04N 13/10–194; H04N 13/239; H04N 13/243; H04N 13/25; H04N 13/282; H04N 13/30–398; G06T 2207/10052; G06F 17/30268
See application file for complete search history.

(56) References Cited

U.S. PATENT DOCUMENTS

| | | |
|---|---|---|
| 8,289,440 B2 | 10/2012 | Knight et al. |
| 8,379,105 B2 | 2/2013 | Georgiev et al. |
| 2005/0286759 A1* | 12/2005 | Zitnick, III ........... G06T 7/0077 382/154 |
| 2011/0234841 A1 | 9/2011 | Akeley et al. |

(Continued)

FOREIGN PATENT DOCUMENTS

WO  WO2014094874  6/2014

OTHER PUBLICATIONS

Anonymous, "Lytro Illum User Manual", http://manuals.lytro.com/illum/full-manual/, Oct. 18, 2014, pp. 1-36.

(Continued)

*Primary Examiner* — Paul M Berardesca
(74) *Attorney, Agent, or Firm* — Lily Neff

(57) ABSTRACT

A method and an apparatus for generating lens-related metadata for a light field imaging device. An image renderer generates a display image from a light field capture using a lens model. A metadata assembler then outputs parameters of the lens model used for generating the display image as lens-related metadata for the light field imaging device.

10 Claims, 4 Drawing Sheets

(56) References Cited

U.S. PATENT DOCUMENTS

| | | |
|---|---|---|
| 2012/0249550 A1 | 10/2012 | Akeley et al. |
| 2013/0077880 A1 | 3/2013 | Venkataraman et al. |
| 2013/0113981 A1 | 5/2013 | Knight et al. |
| 2013/0222633 A1 | 8/2013 | Knight et al. |
| 2014/0176592 A1 | 6/2014 | Wilburn et al. |
| 2014/0181630 A1 | 6/2014 | Monney et al. |
| 2015/0082364 A1* | 3/2015 | Jayaram ............ H04N 21/4622 725/109 |
| 2016/0205341 A1* | 7/2016 | Hollander ................. G06T 7/20 375/240.08 |
| 2016/0212406 A1* | 7/2016 | Hayasaka .......... H04N 5/23238 |
| 2017/0078637 A1* | 3/2017 | Hayasaka ............. G06T 3/4007 |
| 2017/0078646 A1* | 3/2017 | Matsunobu ............ H04N 5/247 |

OTHER PUBLICATIONS

Georgiev et al., "Lytro camera technology: theory, algorithms, performance analysis", Proceedings of SPIE, vol. 8667, Feb. 26, 2013, pp. 1-10.

Isaksen et al: "Dynamically Reparameterized Light Fields", Computer Graphics SIGGRAPH 2000 Conference Proceedings, New Orleans, Louisiana, USA, Jul. 23, 2000, pp. 297-306.

* cited by examiner

METHOD AND APPARATUS FOR GENERATING LENS-RELATED METADATA

This application claims the benefit, under 35 U.S.C. § 119 of European Patent Application No. 15305275.8, filed Feb. 23, 2015.

FIELD

The invention relates to a method and an apparatus for generating lens-related metadata. In particular, the invention relates to a method and an apparatus for generating lens-related metadata for a light field imaging device, especially for motion pictures.

BACKGROUND

Focus and depth of field are two parameters that largely affect the visual quality and aesthetic of image acquisition. They are especially important in motion picture films, where it may be required to pull the focus from one plane to another during a shot, for example to follow a moving object or to shift the viewers' attention to another object. Manually adjusting the focal point of the lens is difficult in this situation, especially when working with a shallow depth of field to create a film look. Professional film productions have camera assistants for this task. This does, however, not mean that focus and/or depth of field is always set correctly. Since defocusing errors cannot be fixed in post-production, they either have to be tolerated or the shoot has to be retaken.

Nevertheless lens metadata such as focal length, focus distance and focal ratio, e.g. aperture or iris value, are usually stored with the image data not only for professional but also for consumer cameras. Their value in post-production is rather informative.

In order to keep video and audio recording in sync, timecode signals are distributed among the devices on the film set. LTC (LTC: Linear or Longitudinal Timecode) is an encoding of the SMPTE (Society of Motion Picture and Television Engineers) timecode standard and can be distributed either via 5-pin LEMO connectors or HD-SDI signals (HD-SDI: High Definition Serial Digital Interface).

Light field cameras allow adjusting the focus and depth of field after shooting. This may be considered as a potential advantage to overcome the problem of defocused shots. However, it also means that the process of setting, for example, focus and depth of field is only deferred from shooting to a later point in time.

The decision may even be left up to the user. For example, a so-called "living picture" has been introduced, allowing the user to interactively set the focus distance and slightly vary the viewing angle for rendering multiple views of a same shot.

The possibility of adjusting the focus and depth of field after shooting raises the question how to define a rendering intent for every frame of light field captures and how to pass it through a motion picture production workflow.

SUMMARY

It is an object of the present principles to propose a solution for generating lens-related metadata for a light field imaging device and for making use of such metadata.

According to one aspect of the present principles, a method for generating lens-related metadata for a light field imaging device comprises:

generating a display image from a light field capture using a lens model; and outputting parameters of the lens model used for generating the display image as lens-related metadata for the light field imaging device.

Accordingly, a computer readable storage medium has stored therein instructions enabling generating lens-related metadata for a light field imaging device, which, when executed by a computer, cause the computer to:

generate a display image from a light field capture using a lens model; and output parameters of the lens model used for generating the display image as lens-related metadata for the light field imaging device.

The computer readable storage medium is a non-transitory volatile or non-volatile storage medium, such as, for example, a hard disk, an optical or magnetic disk or tape, a solid state memory device, etc. The storage medium thus tangibly embodies a program of instructions executable by a computer or a processing device to perform program steps as described herein.

Also, in one embodiment an apparatus configured to generate lens-related metadata for a light field imaging device comprises:

an image renderer configured to generate a display image from a light field capture using a lens model; and a metadata assembler configured to output parameters of the lens model used for generating the display image as lens-related metadata for the light field imaging device.

In another embodiment, an apparatus configured to generate lens-related metadata for a light field imaging device comprises a processing device and a memory device having stored therein instructions, which, when executed by the processing device, cause the apparatus to:

generate a display image from a light field capture using a lens model; and output parameters of the lens model used for generating the display image as lens-related metadata for the light field imaging device.

Furthermore, a storage medium comprises light field captures and parameters of a lens model for generating display images from the light field captures.

According to another aspect of the present principles, a method for generating a display image from a light field capture comprises:

retrieving a light field capture from a storage medium;

retrieving parameters of a lens model for generating a display image from the light field capture;

generating a display image from the light field capture using the lens model and the retrieved parameters; and providing the display image to a display.

Accordingly, a computer readable non-transitory storage medium has stored therein instructions enabling generating a display image from a light field capture, which, when executed by a computer, cause the computer to:

retrieve a light field capture from a storage medium;

retrieve parameters of a lens model for generating a display image from the light field capture;

generate a display image from the light field capture using the lens model and the retrieved parameters; and provide the display image to a display.

Also, in one embodiment an apparatus configured to generate a display image from a light field capture comprises:

an image renderer configured to retrieve a light field capture from a storage medium, to retrieve parameters of a lens model, and to generate a display image from the light field capture using the lens model and the retrieved parameters; and a display configured to display the display image or an output configured to provide the display image to a display.

In another embodiment, an apparatus configured to generate a display image from a light field capture comprises a processing device and a memory device having stored therein instructions, which, when executed by the processing device, cause the apparatus to:

retrieve a light field capture from a storage medium;

retrieve parameters of a lens model for generating a display image from the light field capture;

generate a display image from the light field capture using the lens model and the retrieved parameters; and provide the display image to a display.

A general idea described herein is to generate frame-accurate metadata describing parameters of a virtual lens, with parameter such as focal length, focal ratio and focus distance, for motion picture streams from light field acquisition devices. The images resulting from application of the virtual lens are pre-rendered and pre-visualized to enable adjustment of the parameters, either in real-time or non-real-time. The light field captures are either received directly from a light field imaging device, e.g. for an on-set generation of lens-related metadata, or read from a storage system, e.g. for an off-set or near-set generation of lens-related metadata.

The solution has the advantage that it delivers synchronized lens metadata, stored during professional film production for light field acquisition devices that inherently do not provide this metadata or where the metadata is fixed. This provides frame accurate clues for the final rendering intent in post-production.

In one embodiment the parameters of the lens model are related to one or more of focus distance, focal ratio, focal length, lens tilt, and lens shift. Much of the imaging process in traditional photography is defined by these lens characteristics. Therefore, these parameters represent useful restrictions for describing the rendering intent of a film producer.

In one embodiment the lens-related metadata are output as metadata packets. A metadata stream with the lens parameters corresponding to each frame is generated in this way. The rendered output is not necessarily stored, but may of course also be made available.

In one embodiment a user input to adjust one or more of the parameters of the lens model is received via a user interface. Based on the adjusted parameters of the lens model an updated display image is generated. In this way an operator may inspect the image on a monitor and interactively adjust the parameters until he is satisfied with the resulting display image.

In one embodiment a time code is retrieved for the light field capture. For example, the time code is read from the light field capture or received from a time code generator. The time code is then added to the lens-related metadata. In this way synchronization between the lens-related metadata and the light field camera signal, i.e. the light field captures, is ensured.

While the proposed solution focuses on processing a stream of motion pictures, it may also be used to process a single still picture. In that case synchronization does not need to be considered.

DETAILED DESCRIPTION OF PREFERRED EMBODIMENTS

For a better understanding the principles of some embodiments shall now be explained in more detail in the following description with reference to the figures. It is understood that the proposed solution is not limited to these exemplary embodiments and that specified features can also expediently be combined and/or modified without departing from the scope of the present principles as defined in the appended claims.

Light field cameras enable rendering different views of a same shot. Although the parameter design space is large, useful restrictions naturally arise by thinking in terms of traditional photography. Much of the imaging process in traditional photography is defined by the lens characteristics. Prime lenses usually allow adjusting the focus distance and focal ratio, while zoom lenses additionally allow adjusting the focal length. Further parameters can be modeled, like lens tilt and shift. Geometric distortions and chromatic aberrations may change from frame to frame in case the focal length is modified. For simplicity only the three most prominent characteristics, as described above, will be considered in the following.

Figure 1:
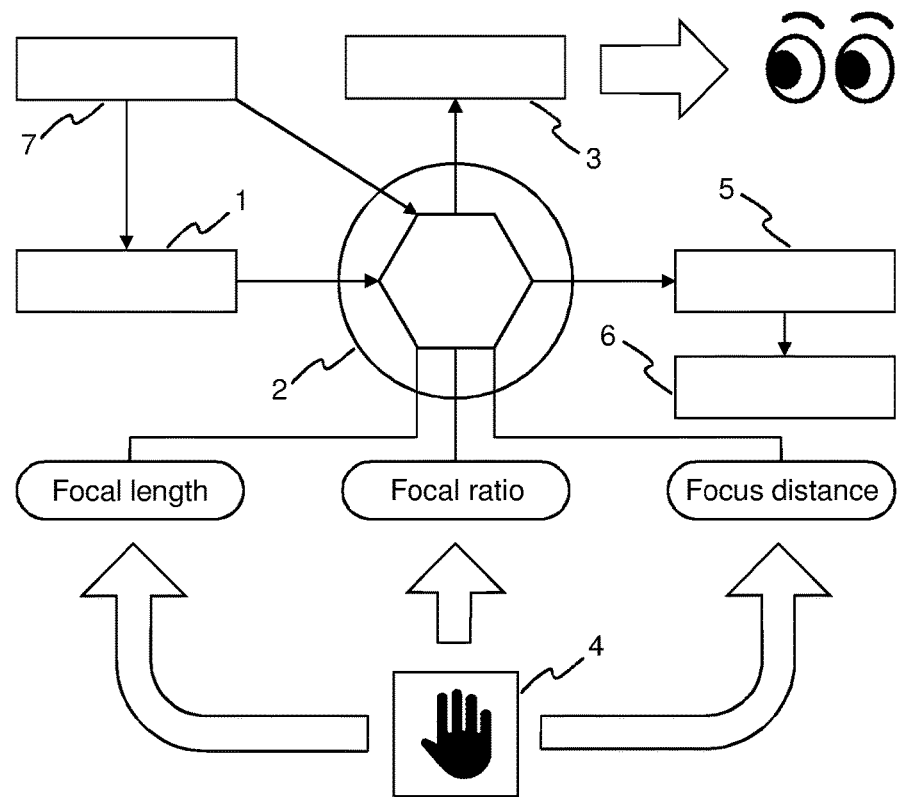
FIG. 1 illustrates an exemplary setup of an on-set solution for generating lens-related metadata for a light field camera.

FIG. 1 shows an exemplary setup of an on-set solution for generating lens-related metadata for a light field camera 1. A digital lens 2 models the behavior of an optical lens in dependence of the above parameters. This is accomplished by a real-time rendering engine that takes each frame from a stream of light-field captures, applies the lens model with the current parameters, and outputs the final rendering to a monitor 3. The digital lens 2 is thus a virtual lens that models a real lens. An operator inspects the image on the monitor 3 and performs adjustments on the parameters via a user interface 4. The rendered output is not necessarily stored. However, a metadata recorder 5 stores a metadata stream with the lens parameters corresponding to each frame and a unique time code stamp on a local or remote storage system 6. The synchronization of the digital lens 2 with the light field camera signal is achieved using state of the art on-set synchronization techniques, e.g. using a time code generator 7.

Figure 2:
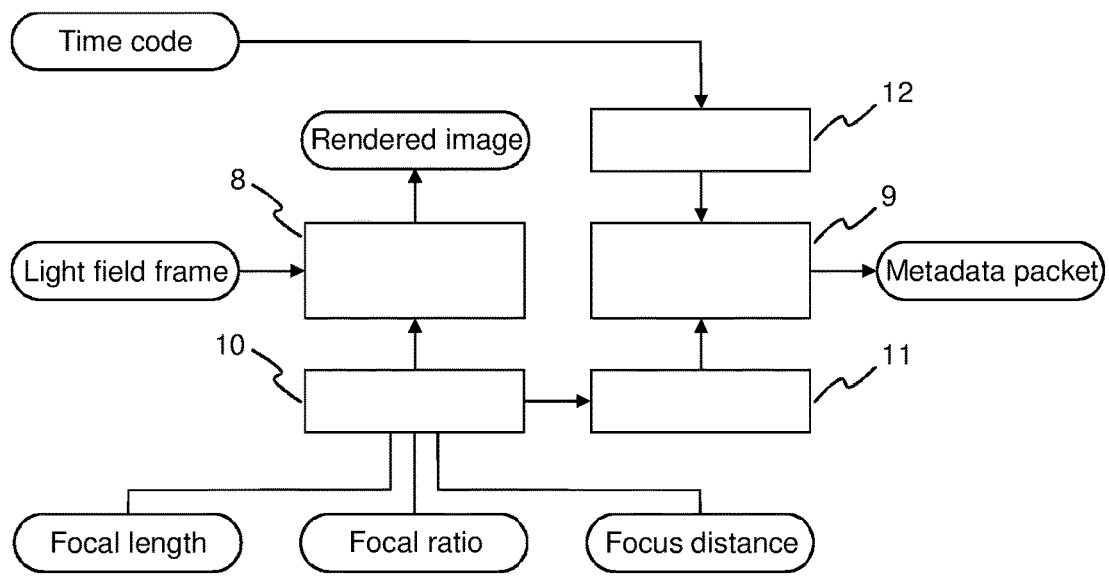
FIG. 2 shows a more detailed illustration of a proposed digital lens.

A more detailed illustration of the digital lens 2 is depicted in FIG. 2. In this figure the digital lens 2 is described by two independent processing blocks, an image renderer 8 and a metadata assembler 9, which operate synchronously for each frame cycle n. The image renderer 8 receives light field captures from the light field camera 1 as well as lens parameters output by a parameterization unit 10 and provides rendered images as an output. The metadata assembler 9 also receives the lens parameters output by the parameterization unit 10 via a first register 11 as well as time codes provided by the time code generator 7 via a second register 12 and assembles these data into metadata packets.

Figure 3:
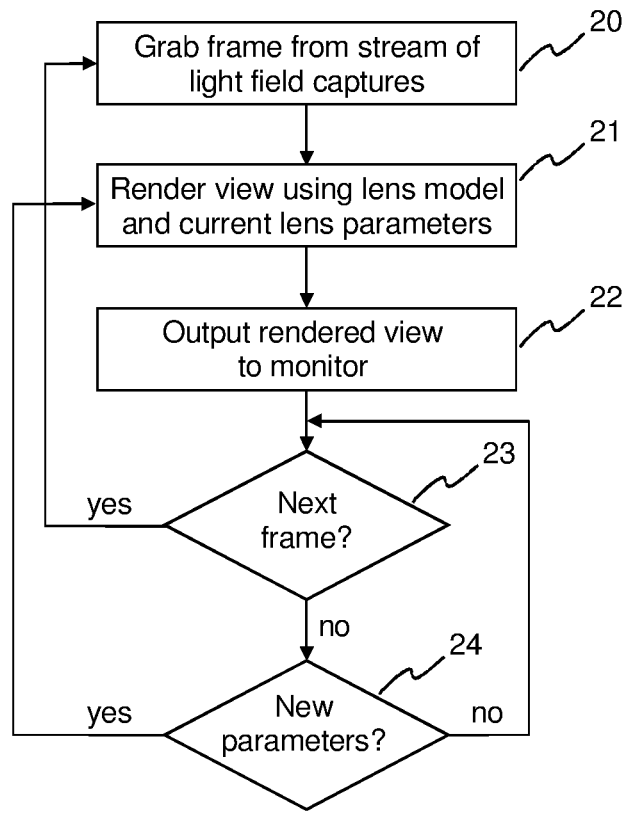
FIG. 3 depicts main operation steps of an image renderer.

The main operation steps of the image renderer 8 are depicted in FIG. 3. The rendering loop performed by the image renderer 8 restarts with each frame cycle and continues to run during the cycle. In a first step a frame F(n) is grabbed 20 from the synchronized stream of light field captures. Using the lens model and the current parameter set P(n) a view is rendered 21 and output 22 to the monitor. It is then checked whether n has changed 23, in which case the image renderer 8 returns to the first step and grabs 20 the next frame, or whether the parameter set P(n) has changed 24, in which case an updated view is rendered 21. The loop is closed by the operator monitoring the rendering output and adjusting the parameters by hand.

Depending on the frame rate and the rendering speed the rendering loop may be executed either exactly once or multiple times per frame. The synchronized stream of light field captures may, for example, be provided via HD-SDI.

Figure 4:
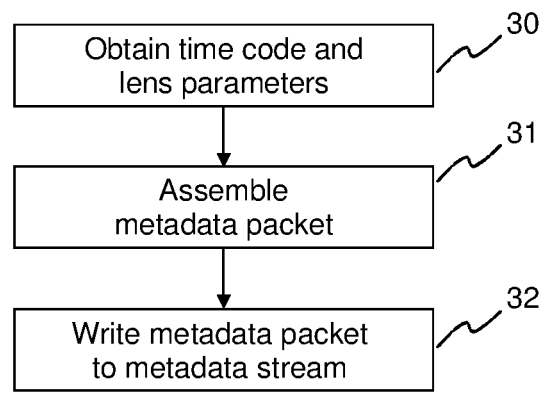
FIG. 4 depicts main operation steps of a metadata assembler.

The main operation steps of the metadata assembler 9 are illustrated in FIG. 4. In a first step the metadata assembler 9 obtains 30 the lens parameter set P(n−1) and the time code T(n−1) of the previous frame from the first register 11 and the second register 12, respectively. From these data the metadata assembler 9 then assembles 31 a metadata packet M(n−1), which finally is written 32 to the metadata stream. The metadata procedure is executed exactly once per frame. It samples 30, assembles 31, and writes 32 the final parameter set of the previous frame. The synchronized metadata packet may, for example, be delivered via HD-SDI to a field recorder using Ancillary Data Packets.

Figure 5:
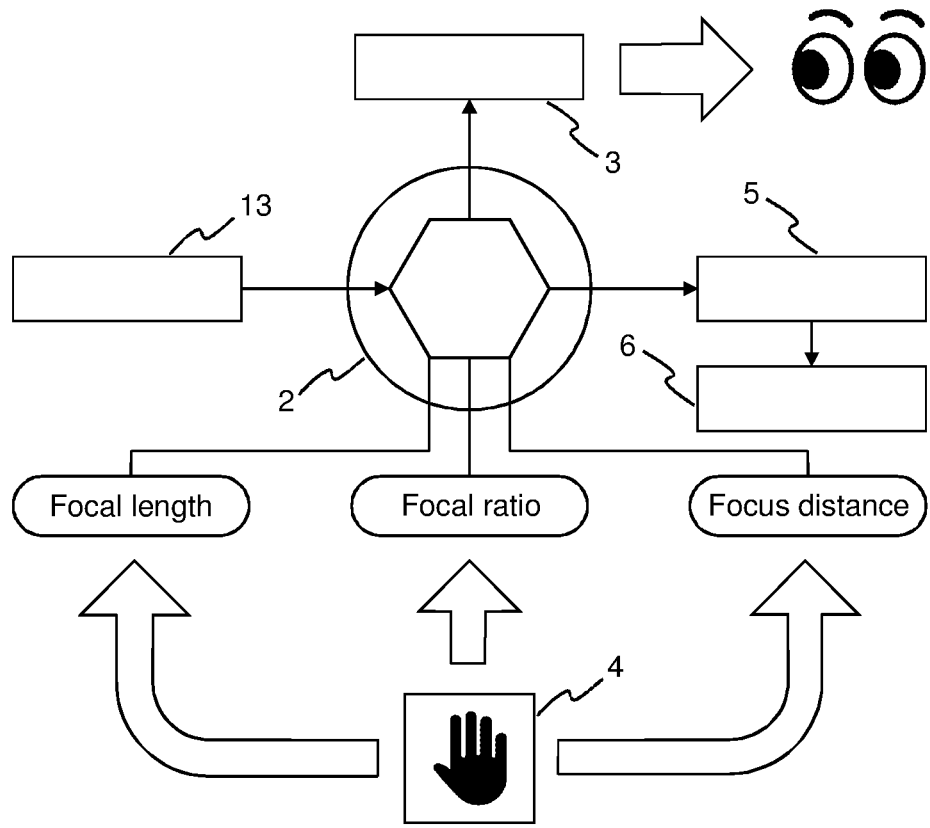
FIG. 5 shows a modification of the on-set solution of FIG. 1 for a near-set environment.

Up to now the proposed solution has been described primarily targeting real-time usage on motion picture film sets. This requires a dedicated device capable of handling the input video and outputting metadata streams at a certain frame rate. However, the solution may also be used in a near-set environment without the need for real time data processing. Instead, a file based approach, working on ingests, can also be applied using PC based software. This requires that the light field capture files provide time code metadata. FIG. 5 shows the corresponding modifications to FIG. 1. In particular, the light field captures are obtained from a storage system 13 instead of the light field camera 1. In addition, the time code generator 7 is no longer used.

Figure 6:
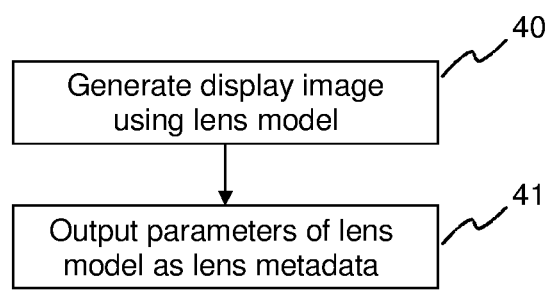
FIG. 6 schematically illustrates an embodiment of a method for generating lens-related metadata for a light field imaging device.

FIG. 6 schematically illustrates a more general embodiment of a method for generating lens-related metadata for a light field imaging device 1. In a first step a display image is generated 40 from a light field capture using a lens model. The parameters of the lens model used for generating the display image are then output 41 as lens-related metadata for the light field imaging device 1.

Figure 7:
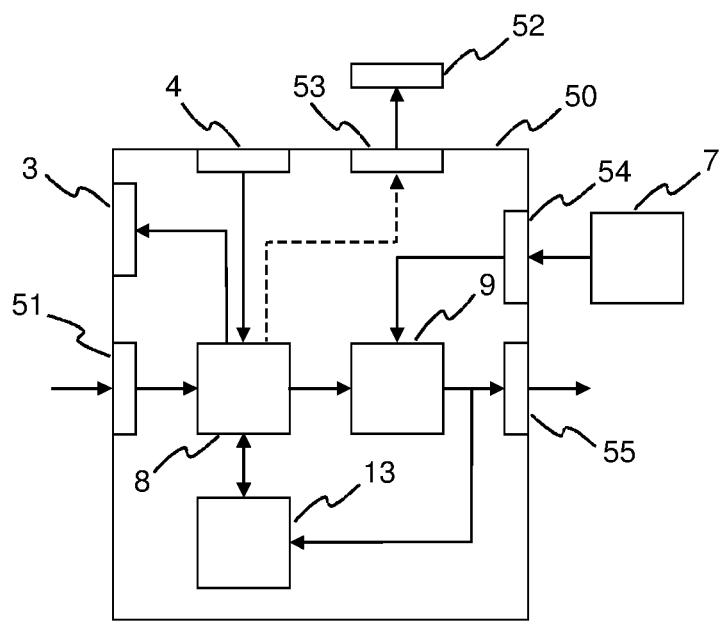
FIG. 7 schematically depicts a first embodiment of an apparatus configured to perform the method of FIG. 6.

One embodiment of an apparatus 50 configured to perform the proposed method for generating lens-related metadata for a light field imaging device 1 is schematically depicted in FIG. 7. The apparatus 50 has an input 51 for receiving a light field capture, e.g. from a light field imaging device 1. Alternatively, the light field capture is retrieved from a storage system 13. In the figure the storage system 13 is a local storage system. Of course, it may likewise be a remote storage system directly connected to the apparatus 50 or connected via a network. An image renderer 8 generates 40 a display image from a light field capture using a lens model. The generated display image is either displayed on a display 3 of the device 50 or provided to an external display 52 via an image output 53. Via a user interface 4 adjustments to the parameters of the lens model are received from an operator. A metadata assembler 9 outputs 41 the final parameters of the lens model as lens-related metadata for the light field imaging device 1. The metadata assembler 9 may further process time codes provided by a time code generator 7 connected via a clock input 54 or provided together with the light field capture. The resulting metadata are made available via an output 55. They may also be stored on the storage system 13. The various interfaces 51, 53, 54, 55 may also be fully or partially combined into one or more bidirectional interfaces. The image renderer 8 and the metadata assembler 9 can be embodied as dedicated hardware or as software running on one or more processors. Of course, they may likewise be combined into a single hardware unit.

Figure 8:
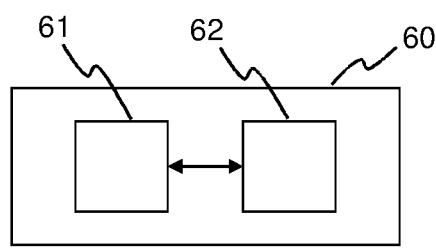
FIG. 8 schematically shows a second embodiment of an apparatus configured to perform the method of FIG. 6.

Another embodiment of an apparatus 60 configured to perform the proposed method is schematically illustrated in FIG. 8. The apparatus 60 comprises a processing device 61 and a memory device 62 storing instructions that, when executed, cause the apparatus to perform steps according to one of the described methods.

For example, the processing device 61 can be a processor adapted to perform the steps according to one of the described methods. In an embodiment said adaptation comprises that the processor is configured, e.g. programmed, to perform steps according to one of the described methods.

A processor as used herein may include one or more processing units, such as microprocessors, digital signal processors, or combination thereof.

The local storage system 13 and the memory device 62 may include volatile and/or non-volatile memory regions and storage devices such as hard disk drives and DVD drives. A part of the memory is a non-transitory program storage device readable by the processing device 61, tangibly embodying a program of instructions executable by the processing device 61 to perform program steps according to the principles as described herein.

The invention claimed is:

1. A method for generating metadata comprising
receiving information having at least one image capture and associated metadata and generating a first set of parameters characterizing optical properties of a virtual lens modelling behavior of an actual lens from said received information
generating a display image from a light field capture using said first set of parameters characterizing said optical properties of said virtual lens wherein said first set of parameters characterizing said optical properties of said virtual lens are focal length, focal ratio, focus distance, lens tilt and lens shift;
outputting said first set of parameters used for generating the display image as the lens-related metadata representative of a light field imaging device from which the light field capture is obtained;
retrieving a time code for the light field capture; and
adding the time code to the lens-related metadata.

2. The method according to claim 1, further comprising outputting the lens-related metadata as metadata packets.

3. The method according to claim 1, further comprising:
receiving a user input to adjust one or more of the parameters characterizing said optical properties of said virtual lens; and
generating an updated display image based on a second set of parameters characterizing said optical properties of said virtual lens and comprising said adjusted parameters.

4. The method according to claim 1, wherein the time code is read from the light field capture or received from a time code generator.

5. The method according to claim 1, wherein the light field capture is received from a light field imaging device or read from a storage system.

6. A computer readable non-transitory storage medium having stored therein instructions enabling generation of metadata packets comprising:
   receive a set of parameters characterizing optical properties of a virtual lens modelling behavior of an actual lens having at least a first set of parameters, called lens-related metadata:
   generate a display image from a light field capture using said first set of parameters characterizing the optical properties of said virtual lens wherein said first set of parameters characterizing said optical properties of said virtual lens are focal length, focal ratio, focus distance, lens tilt and lens shift; and
   output said first set of parameters used for generating the display image as lens-related metadata for a light field imaging device from which the light field capture is obtained;
   retrieve a time code for the light field capture; and
   add the time code to the lens-related metadata.

7. An apparatus configured to generate metadata comprising:
   a processing device configured to receive information having at least one image and associated metadata to generate a set of parameters characterizing optical properties of a virtual lens modelling behavior of an actual lens in dependence of a first set of parameters, called lens-related metadata,
   said processing device also configured to:
   generate a display image from a light field capture using said first set of parameters characterizing the optical properties of said virtual lens wherein said first set of parameters characterizing said optical properties of said virtual lens are focal length, focal ratio, focus distance, lens tilt and lens shift;
   output said first set of parameters used for generating the display image as lens-related metadata for a light field imaging device from which the light field capture is obtained;
   retrieve a time code for the light field capture; and
   add the time code to the lens-related metadata.

8. A method for generating a display image from a light field capture, the method comprising:
   retrieving a light field capture from a storage medium having metadata frame information having a set of related parameters; wherein said parameters have characteristic optical properties of a virtual lens modelling behavior of an actual lens; said optical properties include lens focal length, focal ratio, focus distance, lens tilt and lens shift, for generating a display image from the light field capture;
   retrieving a time code for the light field capture from the storage medium;
   generating a display image from the light field capture using the retrieved parameters and the retrieved time code; and
   providing the display image to a display.

9. A computer readable non-transitory storage medium having stored therein instructions enabling generation of a display image from a light field capture, which, when executed by a computer, cause the computer to:
   retrieve a light field capture from a storage medium;
   retrieve a set of parameters characterizing optical properties of a virtual lens modelling behavior of an actual lens having at least a set of parameters wherein -these parameters characterize optical properties of said virtual lens including focal length, focal ratio, focus distance, lens tilt and lens shift, for generating a display image from the light field capture;
   retrieve a time code for the light field capture from the storage medium;
   generate a display image from the light field capture using the retrieved parameters and the retrieved time code; and
   provide the display image to a display.

10. An apparatus configured to generate a display image from a light field capture, the apparatus comprising a processing device configured to:
    retrieve a light field capture from a storage medium;
    retrieve a set of parameters characterizing optical properties of a virtual lens modelling behavior having at least a set of parameters characterizing optical properties including lens focal length, focal ratio, focus distance, lens tilt and lens shift, for generating a display image from the light field capture;
    retrieve a time code for the light field capture from the storage medium;
    generate a display image from the light field capture using the retrieved parameters and the retrieved time code; and
    provide the display image to a display.

* * * * *